(12) United States Patent
Tsirkin et al.

(10) Patent No.: US 9,164,809 B2
(45) Date of Patent: Oct. 20, 2015

(54) VIRTUAL PROCESSOR PROVISIONING IN VIRTUALIZED COMPUTER SYSTEMS

(75) Inventors: Michael Tsirkin, Yokneam Yillit (IL); Dor Laor, Tel Aviv (IL)

(73) Assignee: Red Hat Israel, Ltd., Raanana (IL)

(*) Notice: Subject to any disclaimer, the term of this patent is extended or adjusted under 35 U.S.C. 154(b) by 281 days.

(21) Appl. No.: 13/603,197

(22) Filed: Sep. 4, 2012

(65) Prior Publication Data

US 2014/0068603 A1 Mar. 6, 2014

(51) Int. Cl.
*G06F 9/455* (2006.01)
*G06F 9/50* (2006.01)

(52) U.S. Cl.
CPC .......... *G06F 9/5083* (2013.01); *G06F 9/45558* (2013.01); *G06F 9/5077* (2013.01); *G06F 2009/4557* (2013.01); *G06F 2209/5022* (2013.01)

(58) Field of Classification Search
CPC ............................ G06F 9/45533; G06F 9/5083
USPC ............................................................. 718/1
See application file for complete search history.

(56) References Cited

U.S. PATENT DOCUMENTS

| 8,589,941 | B2* | 11/2013 | Cardona et al. ............... 718/105 |
| 2005/0120160 | A1* | 6/2005 | Plouffe et al. ..................... 711/1 |
| 2010/0107143 | A1* | 4/2010 | Emberling ..................... 717/128 |
| 2010/0251234 | A1* | 9/2010 | Oshins .............................. 718/1 |
| 2011/0145814 | A1* | 6/2011 | Mangione-Smith ............. 718/1 |
| 2012/0030407 | A1* | 2/2012 | Pandey et al. ..................... 711/6 |
| 2012/0278800 | A1* | 11/2012 | Nicholas et al. .................. 718/1 |
| 2013/0067267 | A1* | 3/2013 | Tamhane et al. ............. 714/4.11 |
| 2013/0191817 | A1* | 7/2013 | Vorbach ........................ 717/150 |
| 2013/0339957 | A1* | 12/2013 | Azam et al. ....................... 718/1 |

OTHER PUBLICATIONS

In View of, Wiktionary, retrieved on Oct. 29, 2014.*
Rate, Wiktionary, retrieved on Oct. 29, 2014.*

* cited by examiner

*Primary Examiner* — Emerson Puente
*Assistant Examiner* — Charlie Sun
(74) *Attorney, Agent, or Firm* — Lowenstein Sandler LLP

(57) ABSTRACT

A system and method for allocating additional virtual processors to virtual machines (referred to as "automatic processor hotplug") are disclosed. In accordance with one embodiment, a guest operating system of a virtual machine detects when a measure of system load exceeds a threshold. In response, the guest operating system transmits a request to a hypervisor for an additional virtual processor for the virtual machine.

20 Claims, 5 Drawing Sheets

VIRTUAL PROCESSOR PROVISIONING IN VIRTUALIZED COMPUTER SYSTEMS

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, in either a one-to-one or one-to-many fashion, to a physical device of the host machine (e.g., a network interface device, a CD-ROM drive, etc.). The hypervisor typically manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
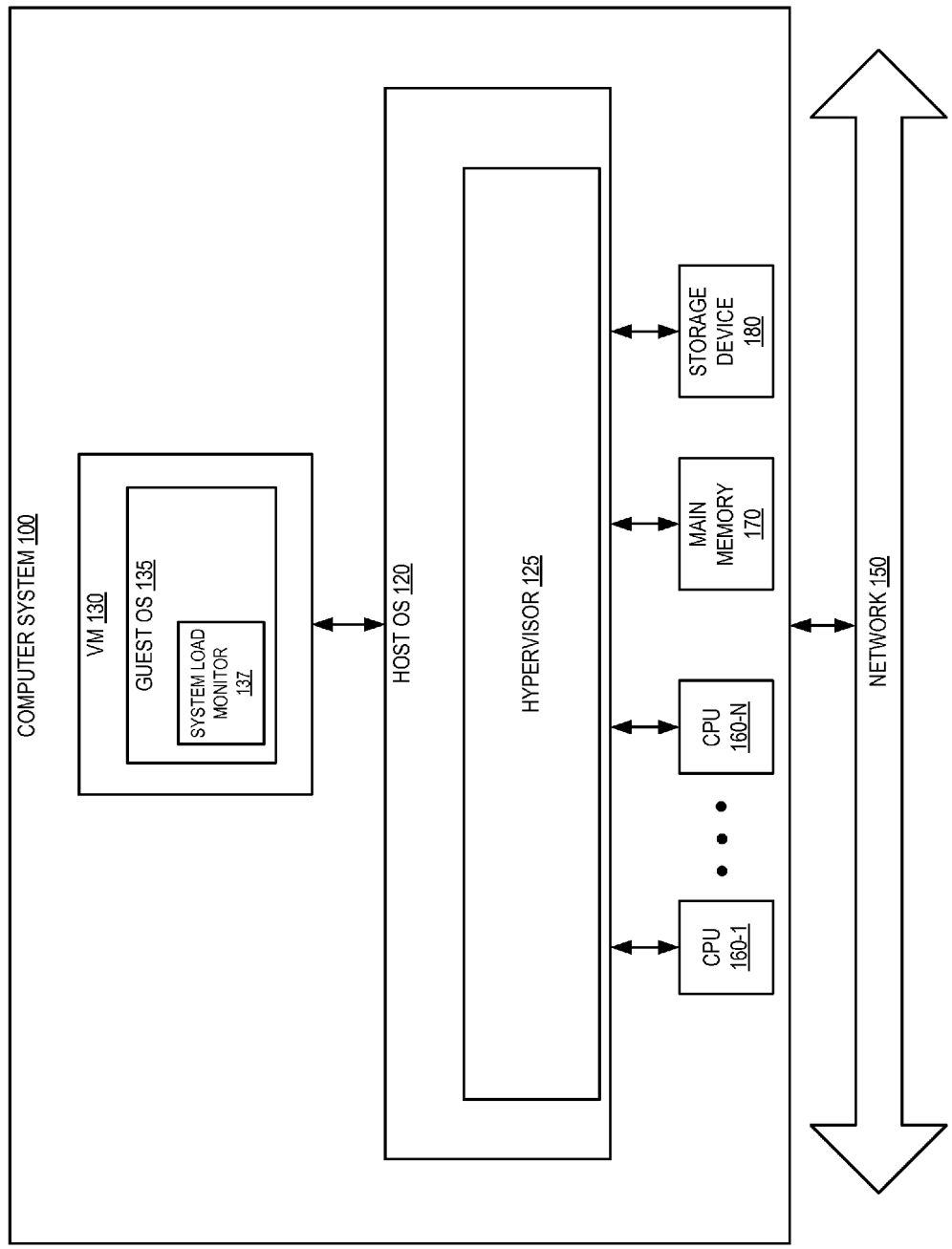
FIG. 1 depicts an exemplary computer system architecture, in accordance with an embodiment of the present invention.

Described herein is a system and method by which a guest operating system (OS) of a virtual machine (VM) may request additional virtual processors from a hypervisor, a technique referred to as "automatic processor hotplug." More particularly, in accordance with one embodiment, the guest OS monitors one or more measures of system load, and when the guest OS detects that a measure of system load exceeds a threshold, the guest OS transmits to the hypervisor a request for an additional virtual processor.

In one embodiment, the guest operating system is modified to perform the functions above and is recompiled to execute on top of the hypervisor, a technique known as "paravirtualization." In one embodiment, the guest operating system includes a system load monitor that executes special commands to monitor various measures of system load, detect when a measure of load exceeds a threshold, and, when appropriate, transmit requests for additional virtual processors to the hypervisor. It should be noted that some alternative embodiments may not employ such a system load monitor, and may instead perform these functions via some other mechanism.

In one embodiment, the measure(s) of system load may include one or more measures for a particular virtual processor of the virtual machine, or one or more measures for a set of virtual processors belonging to a particular virtual NUMA node of the virtual machine, or one or more measures for all of the virtual processors of the virtual machine, or some combination of these measures. In one embodiment, measures for a particular virtual processor may include the number of physical CPU cycles consumed executing a particular virtual processor, the number of context switches per unit of time between threads executed by a particular virtual processor, the percentage of processor cycles consumed by context switches between threads executed by a particular virtual processor, the number of processes in a runnable state executing concurrently by a particular virtual processor, and so forth. Similarly, measures of system load across virtual processors belonging to a particular group (e.g., virtual processors belonging to a particular virtual NUMA node, all of the virtual processors in the virtual machine, etc.) may include the number of physical CPU cycles consumed executing virtual processors of the group, the number of context switches per unit of time between threads belonging to the same process, regardless of which virtual processor of the group executes the process; the percentage of processor cycles consumed by context switches between threads executed by the same virtual processor, regardless of which virtual processor of the group; the number of threads in a runnable state executing concurrently (e.g., the average number of threads in a runnable state executed concurrently by the virtual processors of the group, the maximum number of threads in a runnable state executed concurrently by the virtual processors of the group, etc.), and so forth.

Embodiments of the present disclosure are thus capable of determining when it may be advantageous to request one or more additional virtual processors for a virtual machine, and, as a result, improve the performance of applications executing within the virtual machine when the request is granted by the hypervisor. Advantageously, embodiments of the present disclosure enable this functionality, referred to as "automatic processor hotplug," to occur dynamically, without requiring that the virtual machine be shut down and restarted. Moreover, when a virtualized computer system hosts multiple virtual machines, embodiments of the present invention may enable more efficient mapping of the virtual processors of the virtual machines to the physical CPUs of the system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "monitoring", "detecting", "transmitting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 depicts an exemplary architecture of the salient elements of a computer system 100, in accordance with an embodiment of the present invention. One skilled in the art will appreciate that other architectures for computer system 100 are possible, and that the implementation of a computer system utilizing embodiments of the invention are not necessarily limited to the specific architecture depicted by FIG. 1.

As shown in FIG. 1, the computer system 100 is connected to a network 150 and comprises one or more central processing units (CPUs) 160-1 through 160-N, where N is a positive integer, main memory 170, which may include volatile memory devices (e.g., random access memory (RAM)), non-volatile memory devices (e.g., flash memory) and/or other types of memory devices, and a storage device 180 (e.g., one or more hard disk drives, solid-state drives, etc.). In some embodiments, main memory 170 may be non-uniform access (NUMA), such that memory access time depends on the memory location relative to CPUs 160-1 through 160-N.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 runs a host operating system (OS) 120, which manages the hardware resources of the computer system and that provides functions such as interprocess communication, scheduling, memory management, and so forth. In one embodiment, host operating system 120 also comprises a hypervisor 125, which provides a virtual operating platform for virtual machine 130 and manages its execution. It should be noted that in some alternative embodiments, hypervisor 125 may be external to host OS 120, rather than embedded within host OS 120, or may replace host OS 120.

Virtual machine (VM) 130 is a software implementation of a machine that executes programs as though it were an actual physical machine. In one embodiment, virtual machine (VM) 130 includes a guest operating system (OS) 135 that has a system load monitor 137. Embodiments of virtual machine 130, guest OS 135 and system load monitor 137 are described in more detail below with respect to FIG. 2. It should be noted that although, for simplicity, a single virtual machine 130 is depicted in FIG. 1, in some other embodiments computer system 100 may host a plurality of VMs 130.

Figure 2:
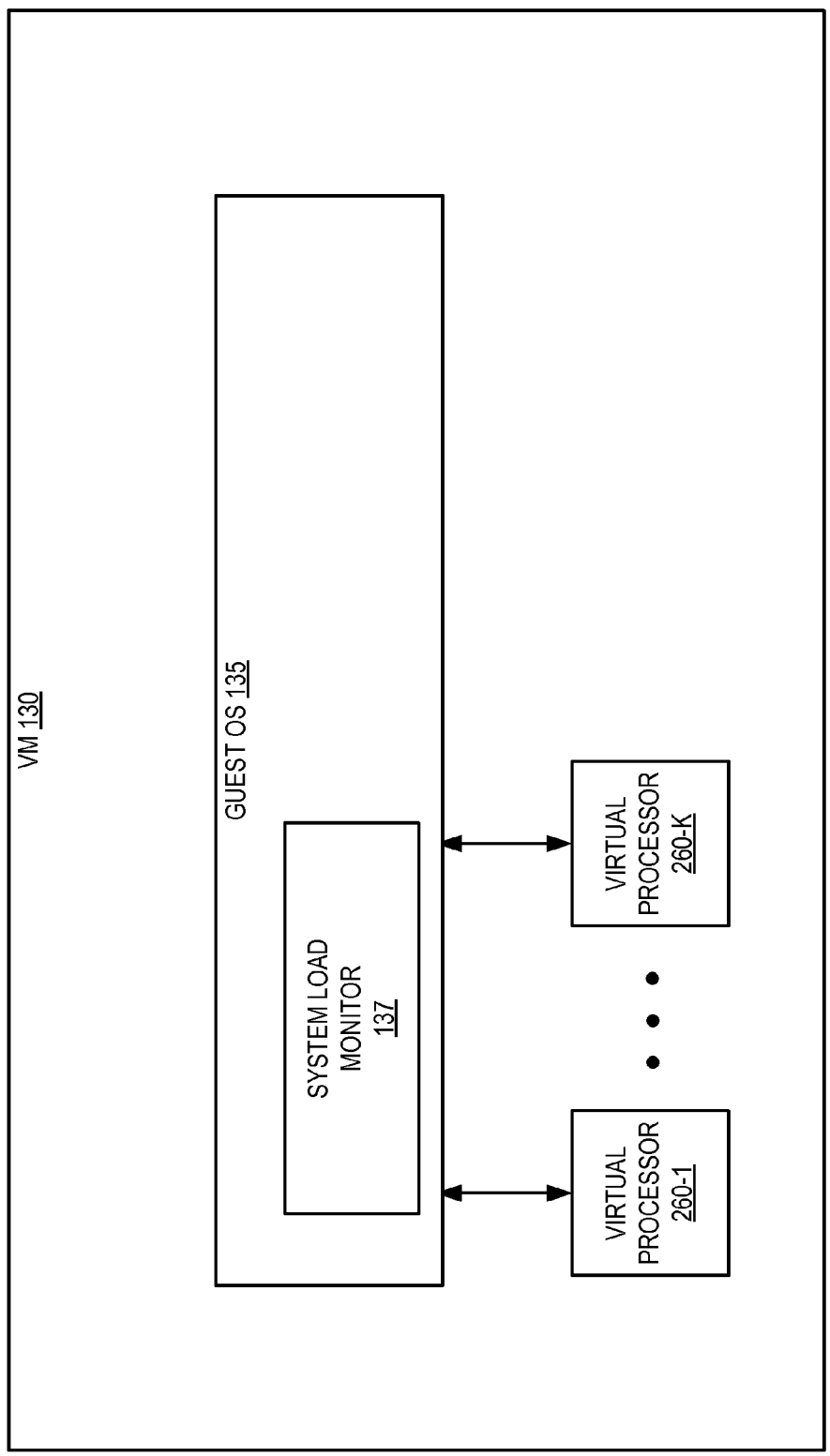
FIG. 2 depicts a block diagram of elements of a virtual machine, in accordance with an embodiment of the present invention.

FIG. 2 depicts a block diagram of elements of virtual machine (VM) 130, in accordance with an embodiment of the present invention. As shown in FIG. 2, virtual machine 130 comprises a guest operating system (OS) 135 and one or more virtual processors 260-1 through 260-K, where K is a positive integer.

Guest operating system (OS) 135 comprises software that manages the execution of programs within virtual machine 130. Each virtual processor 260 is software that emulates a physical processor, and that maps to one of central processing units (CPU) 160, possibly in a many-to-one fashion. It should be noted that the number of virtual processors may or may not be the same as the number of CPUs (i.e., K may or may not equal N). In one embodiment, hypervisor 125 manages these mappings in a transparent fashion, so that guest OS 135 and applications executing on virtual machine 130 interact with virtual processors 260 as though they were actual physical processors.

System load monitor 137 comprises software that monitors one or more measures of system load (e.g., the number of physical processor cycles consumed executing a particular virtual processor of VM 130, the number of context switches per unit of time between threads executed by VM 130, the percentage of physical processor cycles consumed by context switches between threads executed by VM 130, the number of threads in a runnable state executing concurrently, etc.) for one or more of virtual processors 260-1 through 260-K. System load monitor 137 also comprises software that detects when a measure of system load exceeds a threshold, and, upon such detection, transmits a request to hypervisor 125 for an additional virtual processor. Embodiments of system load monitor 137 are described in more detail below with respect to the flow diagrams of FIGS. 3 and 4.

Figure 3:
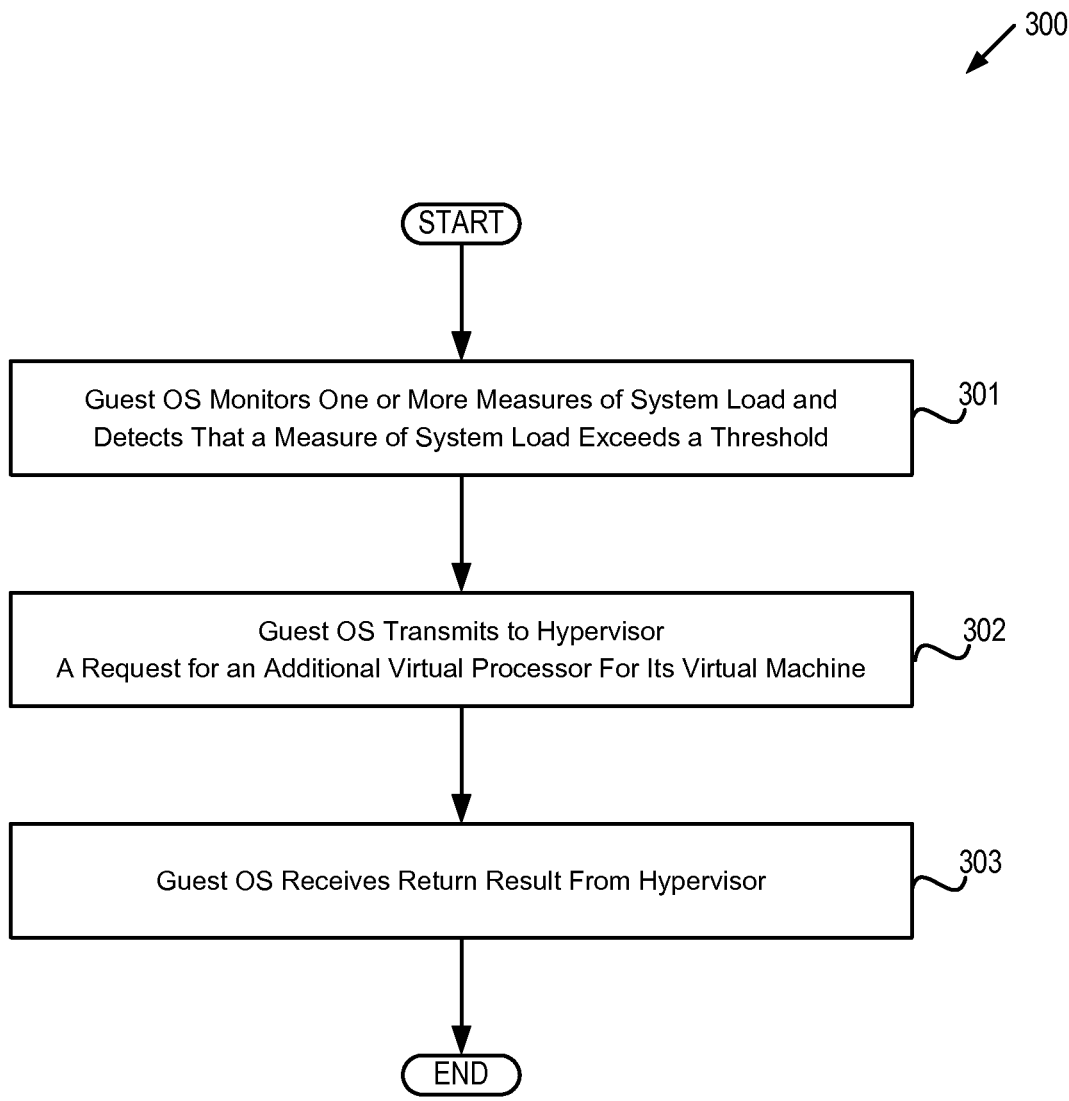
FIG. 3 depicts a flow diagram of one embodiment of a method by which a guest operating system requests an additional virtual processor for its virtual machine.

FIG. 3 depicts a flow diagram of one embodiment of a method 300 by which a guest operating system requests an additional virtual processor for its virtual machine. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that blocks depicted in FIG. 3 can be performed simultaneously or in a different order than that depicted.

At block 301, guest operating system 135 monitors one or more measures of system load and detects that a measure of system load exceeds a threshold. Embodiments of operations involved in performing block 301 are described in more detail below with respect to FIG. 4. In one embodiment, block 301 is performed by system load monitor 137.

At block 302, guest operating system 135 transmits to hypervisor 125 a request for an additional virtual processor 260 for virtual machine 130 (e.g., for a virtual processor 260-(K+1)), in response to the detection at block 301. In some embodiments, the request may specify a particular virtual non-uniform memory access (NUMA) node for the additional virtual processor, or, more generally, may specify for the additional virtual processor a particular group of processors called a proximity domain. It should also be noted that in some other embodiments, the request for an additional virtual processor 260 may be precipitated by a human guest administrator (e.g., in anticipation of an increase in system load, etc.), rather than by system load monitor 137 detecting the exceedance of a threshold at block 301. At block 303, guest operating system 135 receives a return result from hypervisor 125 (e.g., an indication that the request was denied, an indication that the request was granted, an indication that the request was granted along with an identifier of the additional virtual processor, etc.).

Figure 4:
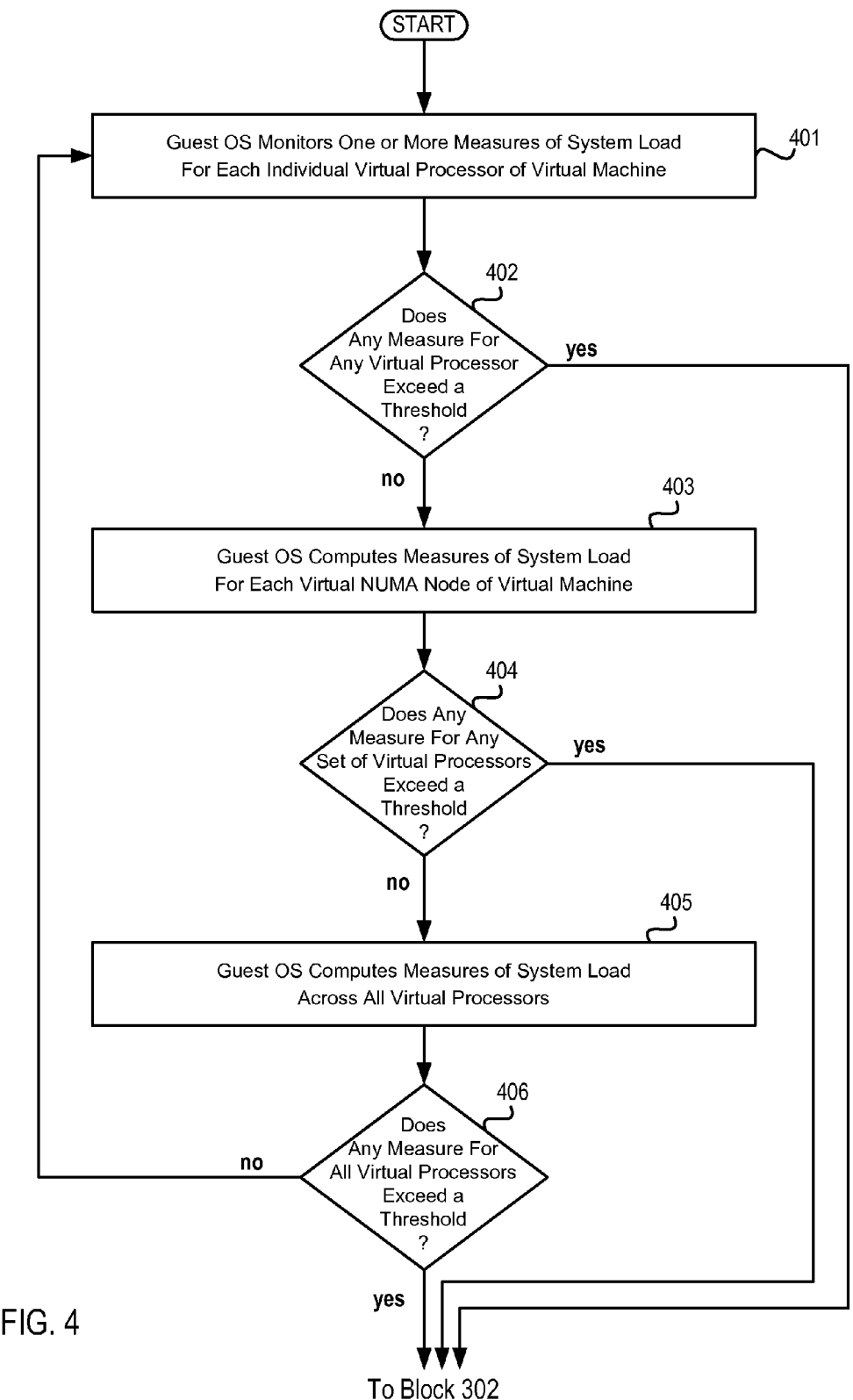
FIG. 4 depicts a flow diagram of one embodiment of a method by which a guest operating system monitors and detects system load conditions.

FIG. 4 depicts a flow diagram of one embodiment of a method by which a guest operating system monitors and detects system load conditions. It should be noted that blocks depicted in FIG. 4 can be performed simultaneously or in a different order than that depicted.

At block 401, guest operating system 135 monitors one or more measures of system load for each individual virtual processor of VM 130 (e.g., for virtual processor 160-1, for virtual processor 160-2, etc.). In one embodiment, the measures of system load may include one or more of the following, each of which may be computed by system load monitor 137 of guest operating system 135:

the number of physical processor cycles consumed executing a particular virtual processor;
the number of context switches per unit of time between threads executed by a particular virtual processor;
the number of context switches per unit of time between threads belonging to the same process executed by a particular virtual processor;
the number of context switches per unit of time between threads belonging to different processes executed by a particular virtual processor;
the percentage of physical processor cycles consumed by context switches between threads executed by a particular virtual processor;
the percentage of physical processor cycles consumed by context switches between threads belonging to the same process executed by a particular virtual processor;
the percentage of physical processor cycles consumed by context switches between threads belonging to different processes executed by a particular virtual processor;
the number of threads in a runnable state executing concurrently by a particular virtual processor;
the number of processes in a runnable state executing concurrently by a particular virtual processor; or
the number of applications in a runnable state executing concurrently by a particular virtual processor.

At block 402, guest operating system 135 checks whether any measure for any of the virtual processors exceeds a respective threshold. It should be noted that in some embodiments, the respective thresholds may be defined by an administrator via a configuration file or graphical user interface, while in some other embodiments, the respective thresholds may be hard-coded into system load monitor 137, while in yet other embodiments, the respective thresholds may be defined in some other manner. If any measure for any of the virtual processors exceeds a respective threshold, then execution continues at block 302 of FIG. 3, otherwise execution proceeds to block 403.

At block 403, guest operating system 135 computes one or more measures of system load for each virtual NUMA node of VM 130 (e.g., for each set of virtual processors 260 belonging to a respective virtual NUMA node of VM 130), at least some of which may be derived from the measures monitored at block 401. In one embodiment, the measures of system load may include one or more of the following:

the number of physical processor cycles consumed executing virtual processors of the virtual NUMA node;
the number of context switches per unit of time between threads executed by the same virtual processor (e.g., the number of context switches per unit of time for each individual virtual processor that belongs to a given virtual NUMA node, averaged over the virtual processors belonging to the NUMA node, etc.);
the number of context switches per unit of time between threads belonging to the same process (e.g., averaged over the virtual processors belonging to the NUMA node);
the number of context switches per unit of time between threads belonging to different processes (e.g., averaged over the virtual processors belonging to the NUMA node);
the percentage of physical processor cycles consumed by context switches between threads executed by the same virtual processor (e.g., the average of the percentages for each of the virtual processors belonging to the NUMA node, etc.);
the percentage of physical processor cycles consumed by context switches between threads belonging to the same process (e.g., averaged over the virtual processors belonging to the NUMA node);
the percentage of physical processor cycles consumed by context switches between threads belonging to different processes (e.g., averaged over the virtual processors belonging to the NUMA node);

the number of threads in a runnable state executing concurrently (e.g., an average of the virtual processors belonging to the NUMA node, a maximum of the virtual processors belonging to the NUMA node, etc.);

the number of processes in a runnable state executing concurrently (e.g., an average of the virtual processors belonging to the NUMA node, a maximum of the virtual processors belonging to the NUMA node, etc.); or the number of applications in a runnable state executing concurrently (e.g., an average of the virtual processors belonging to the NUMA node, a maximum of the virtual processors belonging to the NUMA node, etc.).

In one embodiment, block 403 is performed by system load monitor 137.

At block 404, guest operating system 135 checks whether any of the measures computed at block 403 exceed a respective threshold. If so, execution proceeds to block 302 of FIG. 3, otherwise execution proceeds to block 405.

At block 405, guest operating system 135 computes one or more measures of system load across all virtual processors of VM 130, at least some of which may be derived from the measures monitored at block 401. In one embodiment, the measures of system load may include one or more of the following:

the number of physical processor cycles consumed executing all of the virtual processors of VM 130 (i.e., virtual processors 260-1 through 260-K);

the number of context switches per unit of time between threads executed by the same virtual processor (e.g., the number of context switches per unit of time for each individual virtual processor, averaged over all K virtual processors, etc.);

the number of context switches per unit of time between threads belonging to the same process (e.g., averaged over all K virtual processors);

the number of context switches per unit of time between threads belonging to different processes (e.g., averaged over all K virtual processors);

the percentage of physical processor cycles consumed by context switches between threads executed by the same virtual processor (e.g., the average of the percentages for each of the K virtual processors, etc.);

the percentage of physical processor cycles consumed by context switches between threads belonging to the same process (e.g., averaged over all K virtual processors);

the percentage of physical processor cycles consumed by context switches between threads belonging to different processes (e.g., averaged over all K virtual processors);

the number of threads in a runnable state executing concurrently (e.g., an average of all K virtual processors, a maximum of all K virtual processors, etc.);

the number of processes in a runnable state executing concurrently (e.g., an average of all K virtual processors, a maximum of all K virtual processors, etc.); or the number of applications in a runnable state executing concurrently (e.g., an average of all K virtual processors, a maximum of all K virtual processors, etc.).

In one embodiment, block 405 is performed by system load monitor 137.

At block 406, guest operating system 135 checks whether any of the measures computed at block 405 exceed a respective threshold. If so, execution proceeds to block 302 of FIG. 3, otherwise execution continues back at block 401.

Figure 5:
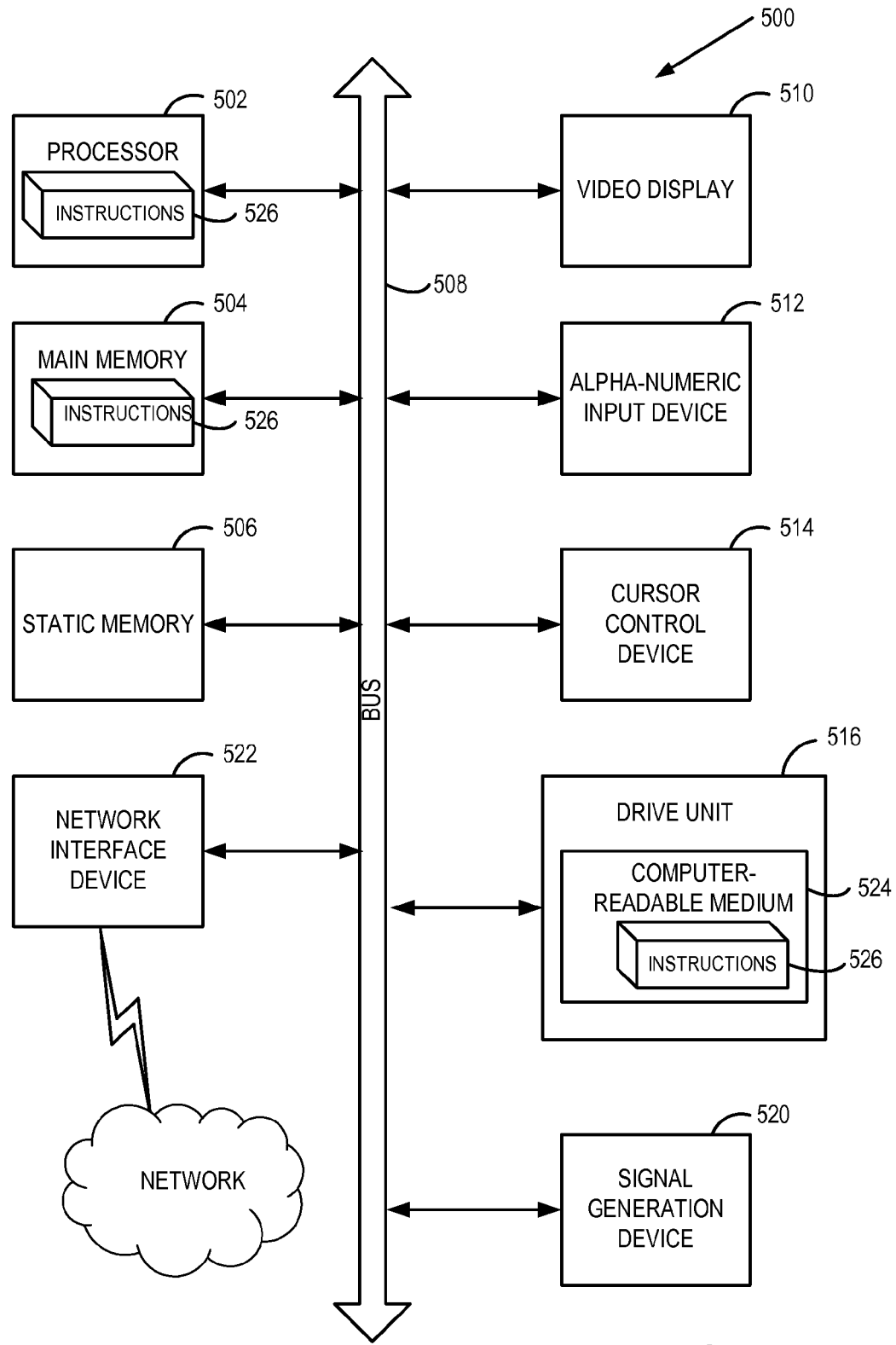
FIG. 5 depicts a block diagram of an illustrative computer system operating in accordance with embodiments of the invention.

FIG. 5 illustrates an exemplary computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing system (processor) 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions 526 (e.g., instructions corresponding to the method of FIG. 3, etc.) embodying any one or more of the methodologies or functions described herein. Instructions 526 may also reside, completely or at least partially, within the main memory 504 and/or within the processor 502 during execution thereof by the computer system 500, the main memory 504 and the processor 502 also constituting computer-readable media. Instructions 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   detecting, by a processor executing a guest operating system of a virtual machine, when a measure of system load for a virtual processor exceeds a threshold; and
   in response to the detection, transmitting to a hypervisor, by the guest operating system, a request for an additional virtual processor for the virtual machine, wherein a memory of the virtual machine is non-uniform memory access (NUMA), wherein the request by the guest operating system specifies a virtual NUMA node within the virtual machine for the additional virtual processor, and wherein the measure of system load for the virtual processor is based on a percentage of processor cycles consumed by context switches between threads executed by the virtual machine, a count of context switches per unit of time between threads executed by the virtual processor and a count of threads in a runnable state executing concurrently.

2. The method of claim 1 wherein the measure of system load pertains to a first virtual processor of the virtual machine.

3. The method of claim 1 wherein the measure of system load pertains to all virtual processors of the virtual machine.

4. The method of claim 1 wherein the measure of system load pertains to a first set of virtual processors belonging to a particular virtual NUMA node within the virtual machine.

5. The method of claim 1 wherein the context switches are between threads belonging to different processes.

6. The method of claim 1 wherein the context switches are between threads belonging to the same process.

7. The method of claim 1, further comprising receiving an indication that the request was granted along with an identifier of the additional virtual processor in response to the request.

8. An apparatus comprising:
   a memory to store a virtual machine; and
   a processor, operatively coupled to the memory, to:
      execute the virtual machine,
      detect, via a guest operating system of the virtual machine, when a measure of system load for a virtual processor exceeds a threshold, and
      in response to the detection, transmitting to a hypervisor, via the guest operating system, a request for an additional virtual processor for the virtual machine, wherein the measure of system load for the virtual processor is based on a percentage of processor cycles consumed by context switches between threads executed by the virtual machine, a count of context switches per unit of time between threads executed by the virtual processor and a count of threads in a runnable state executing concurrently.

9. The apparatus of claim 8 wherein the request specifies a proximity domain of the virtual machine for the additional virtual processor.

10. The apparatus of claim 9 wherein the memory is non-uniform memory access (NUMA), and wherein the proximity domain is a virtual NUMA node.

11. The apparatus of claim 8 wherein the measure of system load pertains to a first virtual processor of the virtual machine.

12. The apparatus of claim 8 wherein the measure of system load pertains to all virtual processors of the virtual machine.

13. The apparatus of claim 8 wherein the context switches are between threads belonging to different processes.

14. The apparatus of claim 8 wherein the context switches are between threads belonging to the same process.

15. The apparatus of claim 8 wherein the processor is further to receive, in response to the request, an indication that the request was granted along with an identifier of the additional virtual processor.

16. A non-transitory computer readable storage medium, having instructions stored therein, which when executed, cause a processor to:
   detect, by a guest operating system of a virtual machine, when a measure of system load for a virtual processor exceeds a threshold;
   in response to the detection, transmit to a hypervisor, by the guest operating system, a request for an additional virtual processor for the virtual machine, wherein a memory of the virtual machine is non-uniform memory access (NUMA), wherein the request by the guest operating system specifies for the additional virtual processor a highly-loaded virtual NUMA node within the virtual machine, and wherein the measure of system load for the virtual processor is based on a percentage of processor cycles consumed by context switches between threads executed by the virtual machine, a count of context switches per unit of time between threads executed by the virtual processor and a count of threads in a runnable state executing concurrently.

17. The non-transitory computer readable storage medium of claim 16 wherein the measure of system load is in view of a number of threads in a runnable state executing concurrently.

18. The non-transitory computer readable storage medium of claim 16 wherein the measure of system load is further based on a number of processes in a runnable state executing concurrently.

19. The non-transitory computer readable storage medium of claim 16 wherein the measure of system load is in view of a number of applications in a runnable state executing concurrently.

20. The non-transitory computer readable storage medium of claim 16 wherein the instructions further cause the processing device to receive an indication that the request was granted along with an identifier of the additional virtual processor in response to the request.

* * * * *